United States Patent [19]

Zollinger

[11] Patent Number: 4,957,469
[45] Date of Patent: Sep. 18, 1990

[54] CONVOLUTED BOOT SEAL WITH ANTI-ABRASION SIDE WALL RIBS

[75] Inventor: Donovan J. Zollinger, Saginaw, Mich.

[73] Assignee: General Motors Corporation, Detroit, Mich.

[21] Appl. No.: 447,331

[22] Filed: Dec. 7, 1989

[51] Int. Cl.⁵ .............................. F16D 3/84
[52] U.S. Cl. .................... 464/175; 277/212 FB
[58] Field of Search ............. 277/212 FB, 207 R; 403/50, 51; 464/173, 175

[56] References Cited

U.S. PATENT DOCUMENTS

| | | | |
|---|---|---|---|
| 2,755,643 | 7/1956 | Wildhaber | 464/175 |
| 3,451,700 | 6/1969 | Smith | 277/212 FB X |
| 4,456,269 | 6/1984 | Krude et al. | 277/212 FB |
| 4,573,693 | 3/1986 | Nakata et al. | 464/175 X |
| 4,702,483 | 10/1987 | Ukai et al. | 464/175 X |

FOREIGN PATENT DOCUMENTS

| | | | |
|---|---|---|---|
| 2925835 | 1/1981 | Fed. Rep. of Germany | 464/175 |
| 2945234 | 5/1981 | Fed. Rep. of Germany | 464/175 |

Primary Examiner—Daniel P. Stodola
Attorney, Agent, or Firm—F. J. Fodale

[57] ABSTRACT

Convoluted boot seals for use on universal joints operating at relatively large angles with the side walls of some convolutions having a series of contact ribs which are formed thereon where abrasion might cause seal wear and failure. These ribs are flexible so that they can bend over when they contact an adjacent, relatively turning side wall so that direct sliding contact and resulting abrasion between adjacent side walls are eliminated.

4 Claims, 2 Drawing Sheets

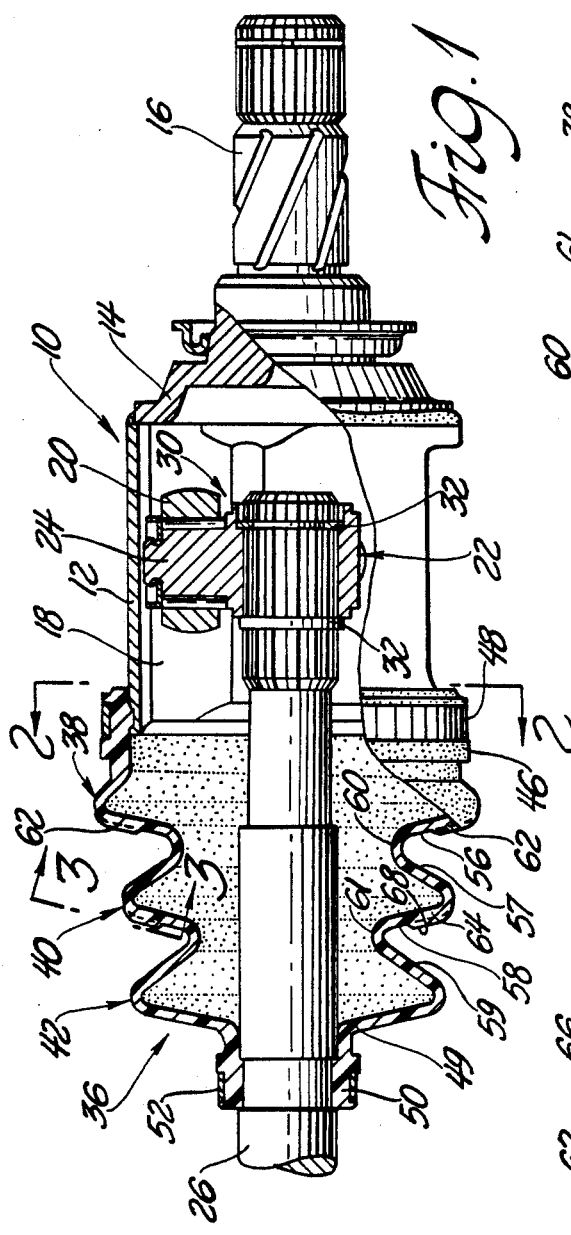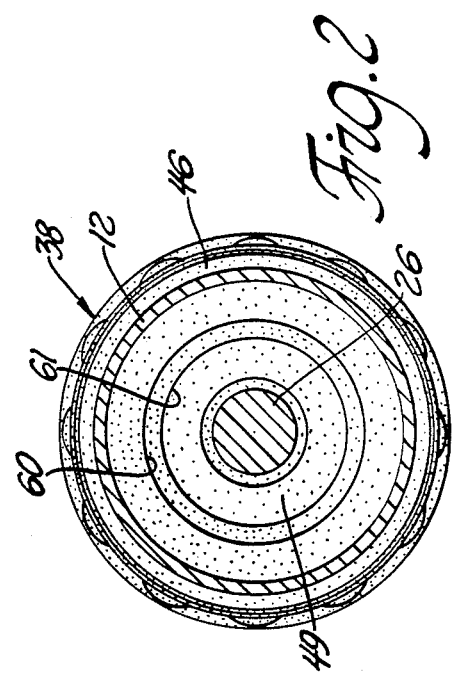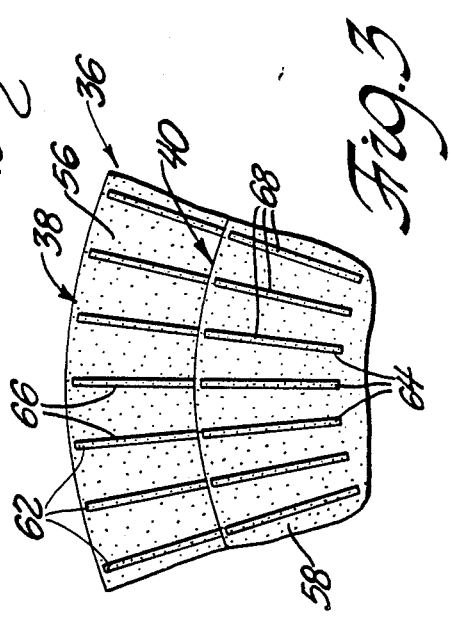

CONVOLUTED BOOT SEAL WITH ANTI-ABRASION SIDE WALL RIBS

TECHNICAL FIELD

This invention related to resilient boot seals providing a flexible closure for protecting universal joints or other devices and more particularly to a new and improved multi-convoluted boot seal operative over a wide temperature and flexure range featuring flexible contact ribs on convolution side walls to minimize wall abrasion and wear and increase boot seal service life.

BACKGROUND OF THE INVENTION

Prior to the present invention, resilient boot seals molded from rubber and plastic materials for enclosing and protecting mechanisms such as constant velocity universal joints have been designed with various specialized constructions to control and improve the action of the boot seal during the various geometric motions of the universal joint. The universal joint boot seal disclosed in U.S. Pat. No. 4,456,269 issued to Werner Krude et al June 26, 1984, for example, is provided with external ribs extending as webs connecting an attachment end portion and an adjacent convolution to reinforce and strengthen areas of the seal. Further, this boot seal has radial inner projections which act as stop means when the joint is articulated toward particular limits. In U.S. Pat. No. 4,702,483 issued to Milio Ukai, et al Oct. 27, 1987, a circumferential convex strip is provided on an inner surface of at least one of the convolutions of a boot seal for a universal joint to control the manner in which the boot collapses under bending operations to prevent the entrapment of certain convolutions between a first convolution and a drive shaft. U.S. Pat. No. 4,573,693 issued to Rikizo Nakata et al Mar. 4, 1986, discloses a boot seal having a special wear resistant coating on the exterior surface thereof to enhance the durability of the seal.

The present invention is of the general category of U.S. Pat. No. 4,456,269 (Krude et al), U.S. Pat. No. 4,702,483 (Ukai et al) and U.S. Pat. No. 4,573,693 (Nakata et al) cited above, but provides new and improved seal construction for reducing seal abrasion and wear to enhance boot seal durability and service life. More particularly, the preferred embodiment of this invention comprises a boot seal which may be molded from a rubber or plastic material into a bellows-like unit having a series of convolutions and which decreases in diameter between spaced attachment end portions. Each convolution is formed with inclined side walls which extend radially inward and connect at roots that provide live hinges which bend during operation of the universal joint or other protected mechanism. With the present invention, a circular arrangement of axially extending and resilient ribs are molded on at least one side face of one of the convolutions that extend to terminal contact faces normally spaced near the adjacent side face of the neighboring convolution. During large bend angles of a universal joint protected by this seal, the contact faces of some of the rib faces physically engage the adjacent face of the ribs and bend as relative turning movement occurs between the convolutions. Frictional wear thus primarily occurs in the contact ribs which are sacrificial instead of at the side faces of the convolution. This reduces abrasion and wear of the boot seal to lengthen seal service life.

It is a feature, object and advantage of the present invention to provide a new and improved multi-convoluted boot seal of resilient material which has axially extending flexible contact ribs arranged in a pattern on at least one of the side walls of a convolution that terminate in contact faces normally adjacent to a facing side wall of a neighboring convolution which bend on contact therewith during relative movement including relative turning of these convolutions.

It is another feature and object of this invention to provide a multi-convoluted boot seal of resilient material with flexible contact ribs to flex and bend during operation of a device enclosed by the boot seal to reduce frictional abrasion between adjacent side walls to enhance boot seal service life.

These and other features, objects and advantages of the present invention will become more apparent from the following detailed description and drawing in which:

FIG. 1 is an elevational view partially sectioned of a drive axle universal joint and boot seal assembly.

FIG. 2 is a sectional view taken along lines 2—2 of FIG. 1.

FIG. 3 is a view taken along lines 3—3 of FIG. 1.

DETAILED DESCRIPTION OF THE DRAWINGS

Figure 4:
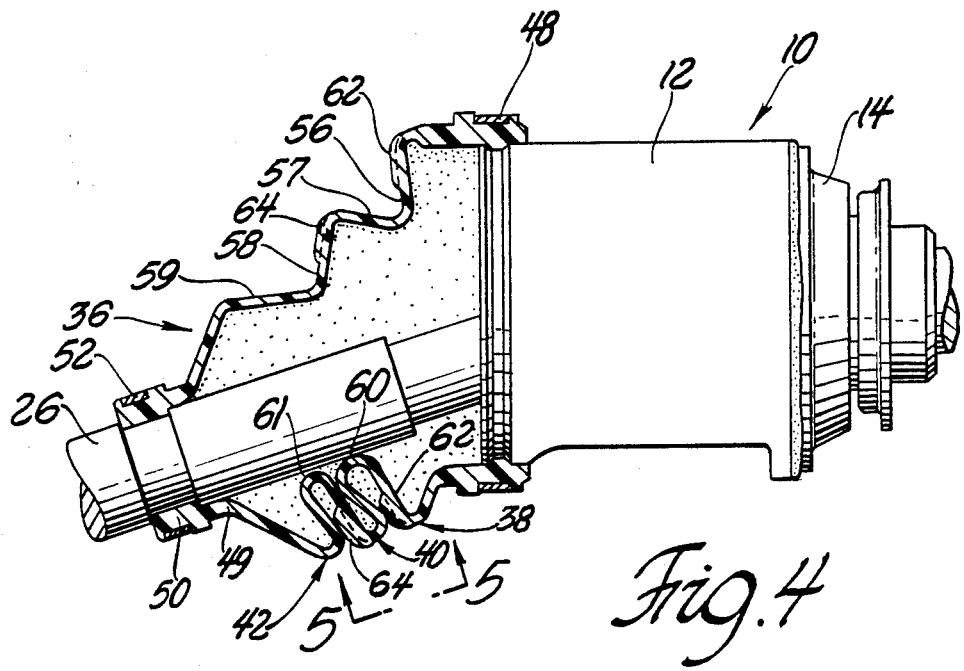
FIG. 4 is a view similar to FIG. 1 showing the universal joint and boot seal assembly in a moved position.

Referring now in greater detail to the drawing, FIG. 1 shows a portion of a vehicle drive axle including a stroking-type universal joint 10 of the tripot type having a three lobe drive housing 12. The drive housing 12 is closed at its inboard end by an end wall 14 and has a centralized input drive shaft 16 integral therewith which extends axially therefrom to a terminal splined end for drive connection to the side gear of a differential providing the rotating output of an automatic or manual transmission, not shown.

The drive housing 12 is open at its outer end and has three equally spaced and longitudinally extending drive channels 18 formed by the internal walls of the lobes of housing 12. These channels have partial spherical tracks that engage the outer surface of associated drive rollers 20 of a spider assembly 22. Each drive roller is mounted by needle bearings on an associated one of three arcuately spaced trunnions 24 extending radially from a centralized hub of the spider assembly. These drive rollers are thus rotatable on the trunnions and are slidable with respect to the housing. With this construction, an elongated axle shaft 26 splined at its inner end to the spider assembly can be rotatably driven by the housing and have sliding pivotal movement with respect thereto.

The spider assembly 22 is drivingly connected by splines to the drive shaft as shown in FIG. 1. The hub of this assembly is trapped between rings 32 which fit into an annular groove formed in the splines of the inboard end portion of shaft 26.

The outboard end of universal joint 10 is sealed by a bellows-type boot seal 36 molded from a natural or synthetic rubber or a suitable plastic.

The boot seal 36 has a series of convolutions 38, 40 and 42 whose diameters are stepped with the largest diameter convolution having an annular collar 46 that extends axially and fits around the outer periphery of the outboard end of housing 12. This collar is tightly secured to the housing by clamping band 48. The smallest diameter convolution 42 terminates in an outer root 49 from which a centralized neck portion 50 extends. This neck portion fits on the shaft 26 and is tightly secured thereto by a constricted clamping band 52 so that the interior of the housing and the pivot mechanism of the universal joint are tightly sealed and environmentally protected.

The boot seal convolutions 38, 40 and 42 have angular sidewalls 56, 57, 58 and 59, respectively, which extend radially inward into connection at annular roots 60 and 61 which form live hinges for boot flexure and bending during stroking and angular movements of the shaft 26 relative to housing 12 during the rotational drive of the joint 10 and vehicle operation.

Figure 5:
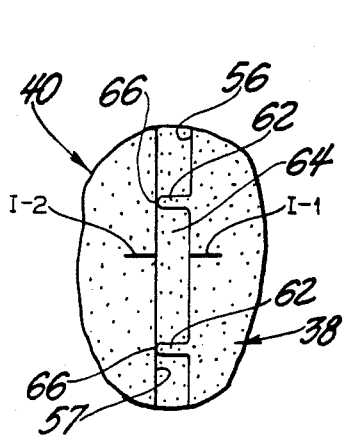
FIG. 5 is a sectional view taken along lines 4—4 of FIG. 3.
Figure 5A:
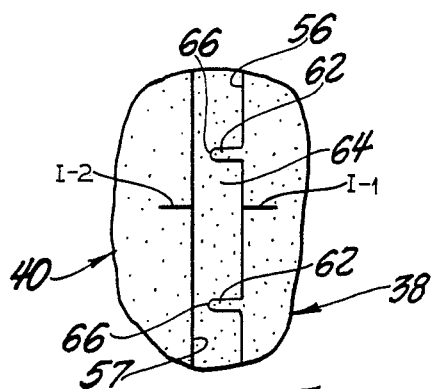
FIG. 5a is a view similar to FIG. 4 illustrating portions of the convolution side walls before rib contact.
Figure 5B:
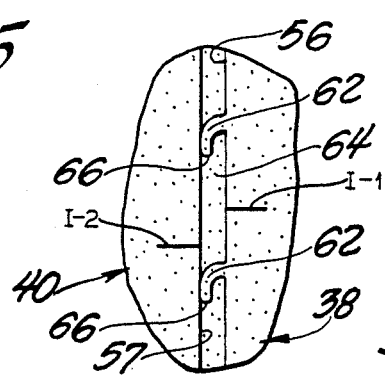
FIG. 5b is a view similar to FIGS. 4 and 4a illustrating rib flexing after contact and relative turning of boot seal convolutions.

In the preferred embodiment of this invention, the side walls 56 and 58 of convolutions 38 and 40, respectively, have arcuately spaced ribs 62 and 64 arranged in a 360° radial spoke pattern. These ribs are resilient, thin wall protrusions molded directly in the side walls 56, 58 to project in a general axial direction toward the side wall of the neighboring convolution and terminate in contact faces 66 and 68. As shown in FIGS. 1 and 5a, the rib faces are all normally spaced from the adjacent side walls. During angulation of the drive axle 26 on vehicle operation such as shown in FIG. 4, portions of the convolution side walls approach one another as shown in FIG. 5a. In the event of further angulation, direct contact between these side walls is prevented by the engagement of the contact faces with the adjacent convolution side walls as illustrated in FIG. 5. Since generally there is some limited turning movement of one convolution relative to the adjacent convolution as diagrammatically shown by indices I-1 and I-2 on convolutions 38 and 40 respectively, the ribs resultantly bend such as illustrated in FIG. 5b so that frictional side wall abrasion and wear between adjacent side walls is substantially eliminated. Accordingly, seal failure from such wear is minimized and service life is maximized. After bending, the ribs quickly recover to their extended position on movement of the universal joint through 180° rotation.

The particular shape, size, location and number of ribs can be modified to suit particular requirements. The ribs may be sacrificial but have a long service life. The boot seal will provide extended effective sealing in the event that the ribs are worn away.

While specific and preferred embodiments of the invention have been shown and described in detail to illustrate application of the inventive principles, it will be understood that the invention may be modified otherwise without departing from such principles.

The embodiments of the invention in which an exclusive property or privilege is claimed are defined as follows:

1. A flexible boot seal of resilient material for enclosing and sealing a device operatively mounted for movement within a housing, said boot seal being a generally annular main body defining a cavity therein and having spaced first and second attachment portions integral with said main body for respective connection to the housing and the device therein, said body having a series of convolutions extending from said first attachment portion to said second attachment portion, said convolutions normally having spaced side walls adjacent to one another hinged at annular roots, so that portions of said adjacent side walls can move into close proximity to one another in response to movement of the device in said housing, at least one of said side walls having a series of resilient ribs formed thereon which generally project toward the side wall of an adjacent convolution, said ribs terminating in contact faces normally spaced from the side wall of said adjacent side wall and for physical contact therewith when said side walls move into close proximity to one another, said ribs subsequently bending in response to relative turning of said adjacent side walls to thereby prevent sliding contact and abrasion of said adjacent side walls.

2. A flexible boot seal for enclosing and sealing a universal pivot joint operatively mounted for movement within a housing and having an axle shaft extending therefrom out of said housing, said boot seal being of a thin walled resilient material having a main body defining a cavity therein and having spaced first and second attachment portions integral with said main body for respective connection to the housing and to the axle shaft, said body having a series of convolutions extending from said first attachment portion to said second attachment portion, said convolutions normally having spaced side walls adjacent to one another interconnected at annular roots, said annular roots providing live hinge means so that portions of said adjacent side walls can move into close proximity to one another in response to angular movement of the axle shaft relative to said housing, at least a first of said side walls having a series of arcuately spaced and resilient ribs formed thereon which generally project toward an adjoining side wall of an adjacent convolution, said ribs terminating in contact faces normally spaced from said adjoining side wall, said faces being engageable with said adjoining side walls when said first and adjoining side walls move into close proximity to one another and relatively turn to effect bending of said ribs so that sliding contact and physical abrasion between said adjacent side walls is effectively eliminated.

3. A boot seal for enclosing and sealing a device operatively mounted within a housing, said boot seal defined by a generally annular body having spaced first and second attachment portions, said body being made of thin wall resilient material to have a series of convolutions extending between said first and second attachment portions, said convolutions having side walls facing one another, at least some of said side walls having a series of resilient thin wall ribs integrally formed on the radial side wall of at least one convolution which projects toward the adjoining side walls of an adjacent convolution, said ribs terminate in contact faces normally spaced from said adjoining side wall and movable into physical contact therewith during varying flexure actions of said boot seal so that said ribs can bend to eliminate direct sliding contact between said adjacent side walls and the physical wear thereof.

4. A boot seal for enclosing and sealing a device operatively mounted for a wide range of angular movement within a housing, said boot seal defined by a generally annular body having spaced first and second attachment portions of relatively thin wall resilient material, said body having a series of convolutions extending between said first and second attachment portions, said convolutions having side walls facing one another, at least some of said side walls having a series of ribs formed on the radial side walls which project toward the side walls of an adjacent convolution, each of said ribs terminating in contact face means normally spaced from the last mentioned side walls for physical contact therewith only during varying angular movements of a device and flexure actions of said boot seal so that said ribs can bend to prevent the sliding contact between said adjacent side walls and abrasion therebetween.

* * * * *